United States Patent
Smith et al.

(10) Patent No.: US 11,802,508 B2
(45) Date of Patent: Oct. 31, 2023

(54) EFFICIENT TURBINE ENGINE USING INTEGRATED AMMONIA FUEL PROCESSING

(71) Applicant: RAYTHEON TECHNOLOGIES CORPORATION, Farmington, CT (US)

(72) Inventors: Lance L. Smith, West Hartford, CT (US); David Lei Ma, Avon, CT (US); Joseph B. Staubach, Colchester, CT (US); Brian M. Holley, Eastford, CT (US); Sean C. Emerson, Broad Brook, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/708,095

(22) Filed: Mar. 30, 2022

(65) Prior Publication Data

US 2023/0313735 A1    Oct. 5, 2023

(51) Int. Cl.

| | |
|---|---|
| *F02C 3/22* | (2006.01) |
| *F02C 7/224* | (2006.01) |
| *F02C 3/04* | (2006.01) |
| *F23R 3/30* | (2006.01) |
| *F02C 3/24* | (2006.01) |
| *C01B 3/04* | (2006.01) |

(52) U.S. Cl.
CPC .................. *F02C 3/22* (2013.01); *F02C 3/04* (2013.01); *F02C 7/224* (2013.01); *F23R 3/30* (2013.01); *C01B 3/047* (2013.01); *F02C 3/24* (2013.01)

(58) Field of Classification Search
CPC .... F02C 3/22; F02C 3/04; F02C 7/224; F02C 3/24; F23R 3/30; C01B 3/047
See application file for complete search history.

(56) References Cited

U.S. PATENT DOCUMENTS

| | | | |
|---|---|---|---|
| 8,220,268 B2 * | 7/2012 | Callas | F02C 7/224 60/39.511 |
| 8,272,353 B2 * | 9/2012 | Dincer | F02M 21/0227 123/3 |
| 11,156,157 B2 | 10/2021 | Ito et al. | |
| 11,156,158 B2 | 10/2021 | Ito et al. | |
| 11,156,168 B2 | 10/2021 | Nose et al. | |
| 2020/0088102 A1 * | 3/2020 | Roberge | F02C 7/224 |
| 2021/0332759 A1 | 10/2021 | Smith et al. | |

\* cited by examiner

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A gas turbine engine includes a core engine that includes a core flow path where air is compressed in a compressor section, communicated to a combustor section, mixed with an ammonia based fuel and ignited to generate a high energy combusted gas flow that is expanded through a turbine section. The turbine section is mechanically coupled to drive the compressor section. An ammonia flow path communicates an ammonia flow to the combustor section. A cracking device is disposed in the ammonia flow path. The cracking device is configured to decompose the ammonia flow into a fuel flow containing hydrogen (H2). At least one heat exchanger is upstream of the cracking device that provides thermal communication between the ammonia flow and a working fluid flow such that the ammonia fluid flow accepts thermal energy from the working fluid flow.

18 Claims, 4 Drawing Sheets

EFFICIENT TURBINE ENGINE USING INTEGRATED AMMONIA FUEL PROCESSING

STATEMENT REGARDING FEDERALLY SPONSORED RESEARCH OR DEVELOPMENT

The subject of this disclosure was made with government support under Contract No.: DE-AR0001343; WBS #6.E21.0002 awarded by the United States Department of Energy. This invention was made with Government support under Contract. The Government has certain rights in this invention.

TECHNICAL FIELD

The present disclosure relates generally to an ammonia-fueled turbine engine utilizing an ammonia-fuel flow to cool portions of the engine and recover waste heat.

BACKGROUND

A gas turbine engine typically mixes a carbon based fuel with air within a combustor where it is ignited to generate a high-energy exhaust gas flow. The high-energy exhaust gas flow includes carbon that is eventually exhausted into the environment. Alternative engine structures and fuels may aid in the reduction and/or elimination of carbon emissions. One such alternative fuel is ammonia.

Turbine engine manufacturers continue to seek further improvements to engine performance including improvements to reduce environmental impact while improving propulsive efficiencies.

SUMMARY

A gas turbine engine according to an exemplary embodiment of this disclosure, among other possible things includes a core engine that includes a core flow path where air is compressed in a compressor section, communicated to a combustor section, mixed with an ammonia based fuel and ignited to generate a high energy combusted gas flow that is expanded through a turbine section. The turbine section is mechanically coupled to drive the compressor section. An ammonia flow path communicates an ammonia flow to the combustor section. A cracking device is disposed in the ammonia flow path. The cracking device is configured to decompose the ammonia flow into a fuel flow containing hydrogen ($H_2$). At least one heat exchanger is upstream of the cracking device that provides thermal communication between the ammonia flow and a working fluid flow such that the ammonia fluid flow accepts thermal energy from the working fluid flow.

In a further embodiment of the foregoing, the gas turbine engine further includes a turboexpander downstream of the at least one heat exchanger. The turboexpander is configured to generate a mechanical drive output from expansion of the ammonia flow that is communicated from the at least one heat exchanger.

In a further embodiment of any of the foregoing, the working fluid flow includes a core airflow through the compressor section and the at least one heat exchanger provides intercooling of the core airflow within the compressor section.

In a further embodiment of any of the foregoing, the compressor section includes a low pressure compressor and a high pressure compressor and the at least one heat exchanger is configured to cool the core airflow after the low pressure compressor and before the high pressure compressor section.

In a further embodiment of any of the foregoing, the working fluid flow comprises a cooling airflow tapped from the compressor section and the at least one heat exchanger provides for the transfer of heat from the cooling airflow into the ammonia flow.

In a further embodiment of any of the foregoing, the working fluid flow includes an exhaust gas flow aft of the combustor and the at least one heat exchanger is configured to transfer thermal energy from the exhaust gas flow into the ammonia flow upstream of the cracking device.

In a further embodiment of any of the foregoing, the at least one heat exchanger includes an intercooling heat exchanger and a cooling air heat exchanger. The intercooling heat exchanger provides thermal communication between a core airflow within the compressor section and the ammonia flow and the cooling air heat exchanger provides thermal communication between a cooling airflow and the ammonia flow.

In a further embodiment of any of the foregoing, the gas turbine engine includes an exhaust gas heat exchanger that places an exhaust gas flow in thermal communication with the ammonia flow that is exhausted from the cooling air heat exchanger.

In a further embodiment of any of the foregoing, the gas turbine engine further includes a turboexpander downstream of the cooling air heat exchanger. The turboexpander is configured to generate a mechanical drive output from expansion of the ammonia flow.

In a further embodiment of any of the foregoing, the ammonia flow is exhausted from the turboexpander and is communicated to the cracking device.

In a further embodiment of any of the foregoing, the cracking device is in thermal communication with an exhaust gas flow to input thermal energy into the ammonia flow.

A fuel system for a turbine engine, the fuel system, according to an exemplary embodiment of this disclosure, among other possible things includes a fuel storage device that is configured to store an ammonia fuel. A cracking device is configured to decompose an ammonia flow into a flow containing hydrogen ($H_2$). At least one heat exchanger is upstream of the cracking device that provides thermal communication between the ammonia flow and a working fluid flow such that the ammonia fluid flow accepts thermal energy from the working fluid flow. A turboexpander is configured to receive the ammonia flow before the cracking device. The ammonia flow is expanded through the turboexpander to drive a mechanical output.

In a further embodiment of the foregoing, the at least one heat exchanger includes an intercooling heat exchanger and a cooling air heat exchanger. The intercooling heat exchanger provides thermal communication between a core airflow within a compressor section of the turbine engine and the ammonia flow and the cooling air heat exchanger provides thermal communication between a cooling airflow and the ammonia flow.

In a further embodiment of any of the foregoing, the fuel system includes an exhaust gas heat exchanger that places an exhaust gas flow in thermal communication with the ammonia flow that is exhausted from the cooling air heat exchanger.

In a further embodiment of any of the foregoing, the fuel system further includes a turboexpander that is downstream of the cooling air heat exchanger. The turboexpander is configured to generate a mechanical drive output from expansion of the ammonia flow.

In a further embodiment of any of the foregoing, the ammonia flow exhausted from the turboexpander is communicated to the cracking device and the cracking device is in thermal communication with the exhaust gas flow to input thermal energy into the ammonia flow.

A method of operating a turbine engine, according to an exemplary embodiment of this disclosure, among other possible things includes transferring thermal energy from a working fluid flow into an ammonia flow within at least one heat exchanger prior to decomposition of the ammonia flow, decomposing the ammonia flow with a cracking device into a flow containing hydrogen ($H_2$) and ammonia ($NH_3$), and communicating the flow containing hydrogen ($H_2$) and ammonia ($NH_3$) to a combustor that is configured to generate a gas flow.

In a further embodiment of the foregoing, the method further includes generating a mechanical drive output by expanding the ammonia flow through a turboexpander prior to decomposition of the ammonia flow.

In a further embodiment of any of the foregoing, the working fluid flow includes a core airflow through a compressor section of the turbine engine and transferring of thermal energy includes transferring thermal energy from the core airflow into the ammonia flow prior to decomposition of the ammonia flow.

In a further embodiment of any of the foregoing, the method further includes transferring thermal energy from a cooling airflow that is tapped from a compressor section into the ammonia flow prior to decomposition of the ammonia flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
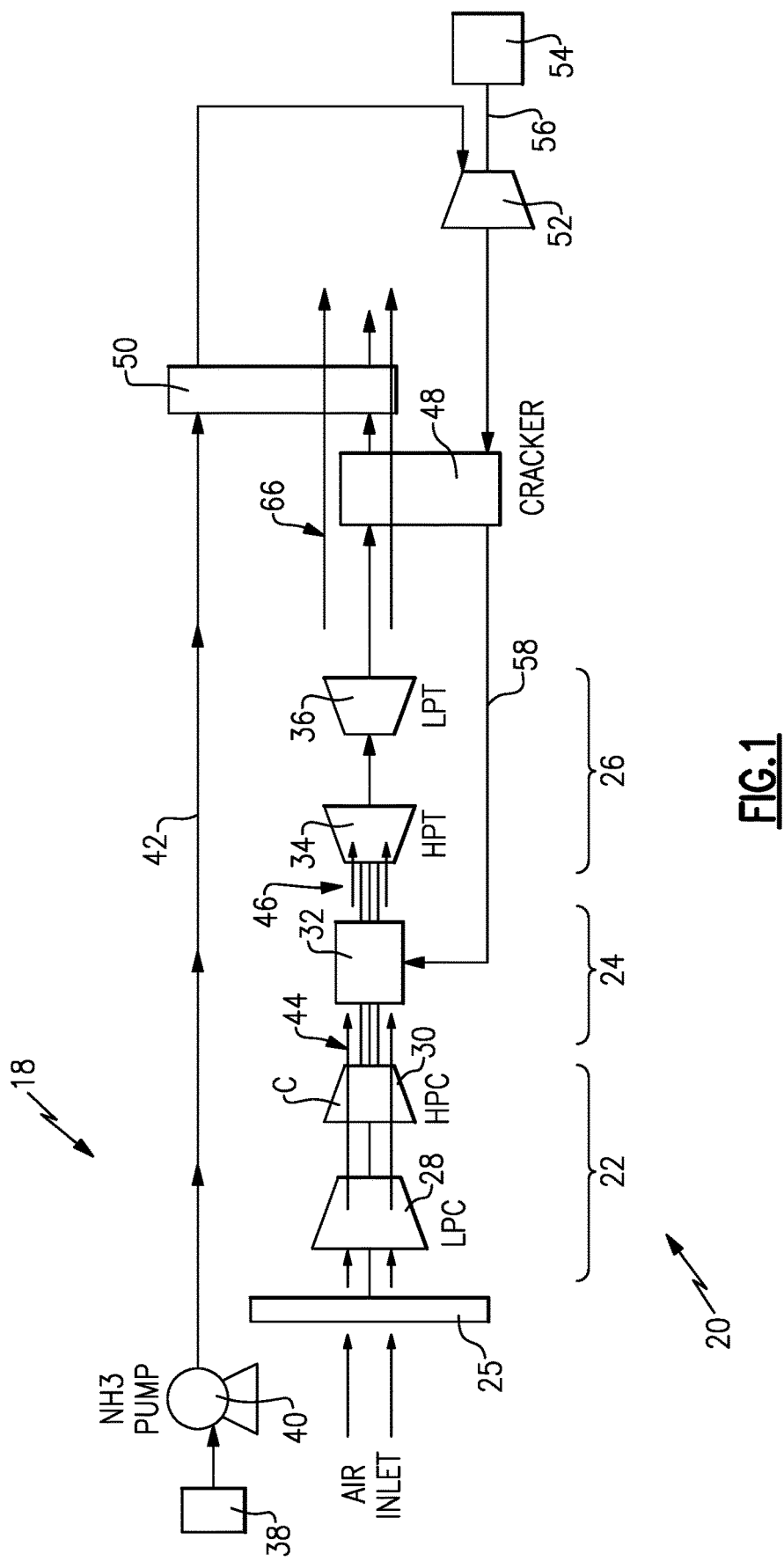
FIG. 1 is a schematic view of an example turbine engine embodiment.

FIG. 1 schematically illustrates an example alternate fueled turbine engine assembly 20 including a core engine including a core flow path C where air is compressed in a compressor section 22, communicated to a combustor section 24, mixed with an ammonia based fuel 58 and ignited to generate a high energy combusted gas flow 46 that is expanded through a turbine section 26 and exhausted as a high temperature exhaust gas flow 66. The turbine section 26 is mechanically coupled to drive the compressor section 22 and a propulsive fan 25. In the disclosed example engine assembly 20, the compressor section 22 includes a low pressure compressor section 28 that communicates pressurized core airflow 44 to a high pressure compressor 30. The turbine section includes a high pressure turbine 34 and a low pressure turbine 36 that are coupled to drive a corresponding one of the low pressure compressor 28 and the high pressure compressor 30. In this disclosed example, the low pressure turbine section 36 is also coupled to drive the fan 25.

The engine assembly 20 uses an ammonia based fuel flow 58. The ammonia based fuel flow 58 includes hydrogen ($H_2$) generated from decomposition of the ammonia ($NH_3$) flow 42. The ammonia based fuel flow 58 is mixed with the core airflow 44 in the combustor 32 to generate the high energy combusted gas flow 46 that expands through the turbine section 26 to drive the compressor section 22. It should be appreciated, that the engine 20 is shown schematically and that other structures and engine configurations such as 2-spool, 3-spool and geared turbofan engines would benefit from this disclosure and are within the contemplation and scope of this disclosure. Moreover, both aircraft and land based turbine engines would benefit from application of the features of this disclosure. The disclosed ammonia based fuel flow is generated by decomposition of ammonia ($NH_3$) provided by a cracking device 48 of a fuel system 18.

Ammonia ($NH_3$) does not contain carbon, but does have a fuel energy similar to alcohols such as methanol. Ammonia can also be transported and stored in liquid form at moderate pressure and temperature, similar to propane. For example, ammonia is a liquid at a pressure of about 8.5 atm and a temperature of 20° C. Alternatively, ammonia is a liquid at a pressure of 1 atm and a temperature of −33° C. Moreover, because ammonia does not contain carbon it may be heated to temperatures above that of a hydrocarbon fuel without forming carbon deposits on portions of the fuel system 18. The increased temperature capabilities provide an increased heat sink capacity that can improve engine efficiency.

The disclosed fuel system 18 uses heat in the presence of a catalyst in a cracking device 48 to decompose an ammonia flow 42 into mostly component parts of hydrogen and nitrogen. The component parts of hydrogen and nitrogen are communicated to the combustor 32 to produce the high energy gas flow 46 via combustion.

The ammonia is stored in a fuel storage tank 38 and pressurized by a fuel pump 40. The fuel pump 40 increases the pressure of the ammonia flow 42 to a higher level for communication into the combustor 32. Prior to being communicated to the combustor 32, the ammonia flow is communicated to the cracking device 48 for decomposition into a fuel flow having component parts of hydrogen and nitrogen.

The ammonia flow 42 has a capacity for absorbing thermal energy that is utilized to recapture energy from waste heat otherwise lost by venting of the hot exhaust gas flow 66. The disclosed example engine uses the thermal capacity of the ammonia flow to cool other working engine flows and recover lost energy. The term working engine flows is utilized within this disclosure to describe airflows, cooling airflows, exhaust flows, fuel flows, hydraulic flows and any other flows that are utilized within an engine to perform work and/or communicate pressure or thermal energy.

In this disclosed example, the fuel system 18 provides the ammonia flow 42 to a turboexpander 52 after the ammonia flow 42 absorbs thermal energy from the hot exhaust gas flow 66 in an exhaust heat exchanger 50. The heated ammonia flow 42 is expanded through the turboexpander 52 to drive a shaft 56 that can power a power conversion device 54. The power conversion device 54 may be a generator to produce electric power, a pump to pressurize a working fluid or any other device that utilizes shaft power.

The pressure of the ammonia flow 42 drops as it expands through the turboexpander 52 and is exhausted to the cracking device 48. In the cracking device 48, the ammonia flow 42 is decomposed into component elements to provide a fuel flow to the combustor 32. The cracking device 48 is in thermal communication with the hot exhaust gas flow 66 to provide the thermal energy needed for decomposition of the ammonia flow 42.

Cracking the ammonia fuel flow after its pressure has decreased during expansion through the turboexpander 52 may provide desired conditions for improved decomposition into a desired fuel composition.

Figure 2:
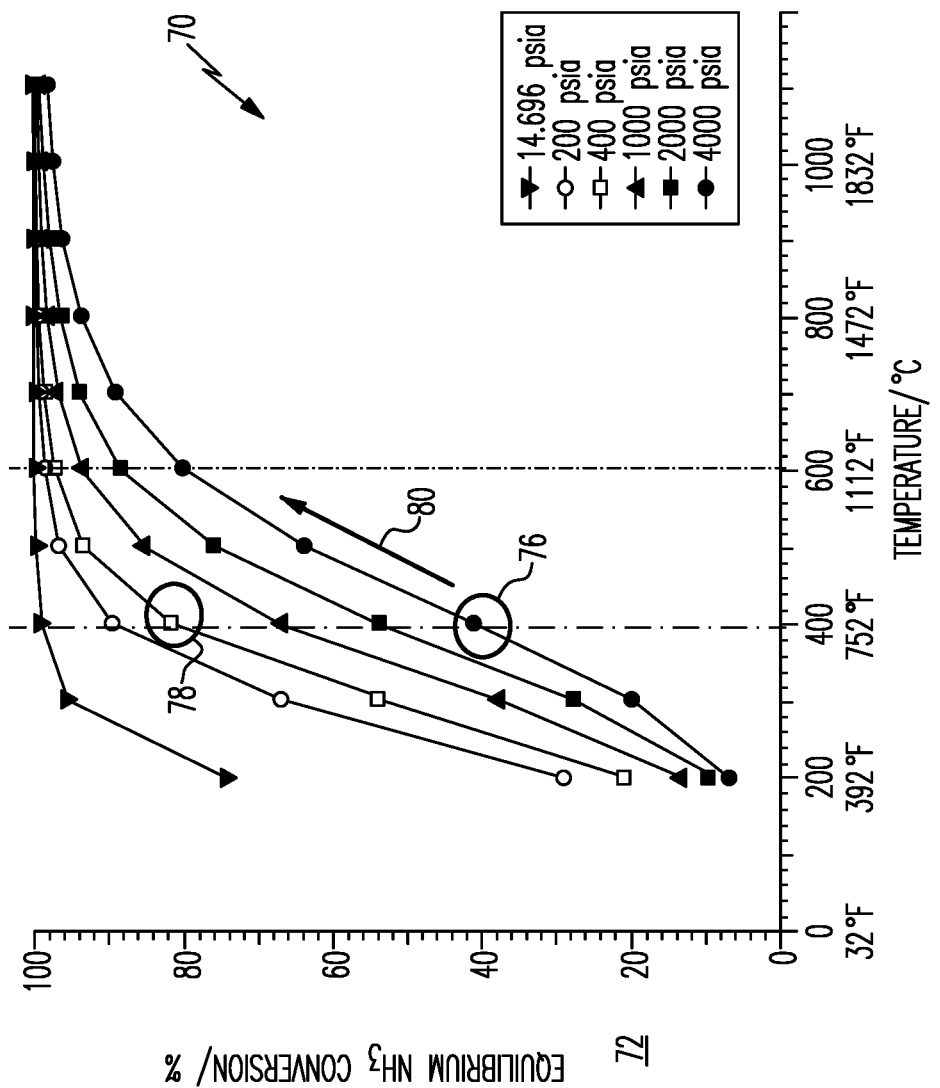
FIG. 2 is a graph illustrating a conversion percentage of ammonia ($NH_3$) relative to pressure and temperature.

Referring to FIG. 2, with continued reference to FIG. 1, graph 70 illustrates the percentage of ammonia cracked 72 when chemical equilibrium is reached at different pressures, as a function of temperature shown on the x-axis 74. The graph 70 illustrates that cracking of the ammonia flow 42 at lower pressures is advantageous. If waste-heat is available at 752° F., for example, then at 4000 psia only about 40% cracking can be achieved based on equilibrium limits, see circled point indicated at 76, whereas at 400 psia equilibrium allows cracking of about 80% of the ammonia, see circled point indicated at 78. To achieve 80% cracking at 4000 psia, the waste-heat temperature would need to be about 1112° F. as indicated by arrow 80.

Accordingly, if waste-heat is available at 1112° F. then cracking at 4000 psia can provide not only increased fuel lower heating value (LHV) but also greater work extraction during turbo-expansion of the cracked ammonia as compared to turboexpansion of pure ammonia without cracking. However, if waste-heat is only available at 752° F. then cracking at 400 psia enables that same increased fuel LHV and therefore more thermal capacity than would be possible at 4000 psia with only 752° F. temperature available. For this reason, when the exhaust or waste-heat temperature limits the ammonia (NH₃) cracking conversion level at higher pressures, it can be advantageous to perform the cracking at lower pressures after the turboexpander 52 instead of at higher pressures before the turboexpander 52. Performing cracking only after the turboexpander has the additional advantage that the fluid composition through the turboexpander 52 is constant and predictable. Predictable flow pressures, temperatures and composition enable more efficient designs and operation of the turboexpander 52.

The example fuel system 18 uses thermal energy from the engine 20 to elevate the temperature of the ammonia flow 42 in view of the pressure required to generate decomposition levels. In one disclosed example embodiment, thermal energy is drawn from the exhaust gas flow 66 within the exhaust gas heat exchanger 50. Thermal energy could be drawn from other heat producing engine sections such as within the compressor section 22 or any other hot sections of the engine 20.

The decomposition (cracking) of ammonia into its component part of hydrogen occurs according to the according to the chemical equation:

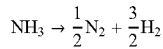

Depending upon the final temperature, pressure and the rate of decomposition in the presence of a catalyst within the cracking device 48, all of the ammonia flow 42 or some portion of the ammonia may become cracked to form the fuel flow 58 containing nitrogen and hydrogen. The cracking process is endothermic and therefore the cracked fuel has increased fuel chemical energy as measured, for example, by a lower heating value (LHV), and can provide increased engine work output or thrust output without increased fuel flow and thereby improves engine fuel efficiency. The LHV is a commonly understood measure of energy released during combustion of fuel at common conditions and is utilized for comparison of energy production between fuels. For example, the LHV is the quantity of heat liberated by complete combustion of a unit volume of fuel initially at 25° C. and 760 mm Hg where the product water from combustion is in the vapor phase.

Figure 3:
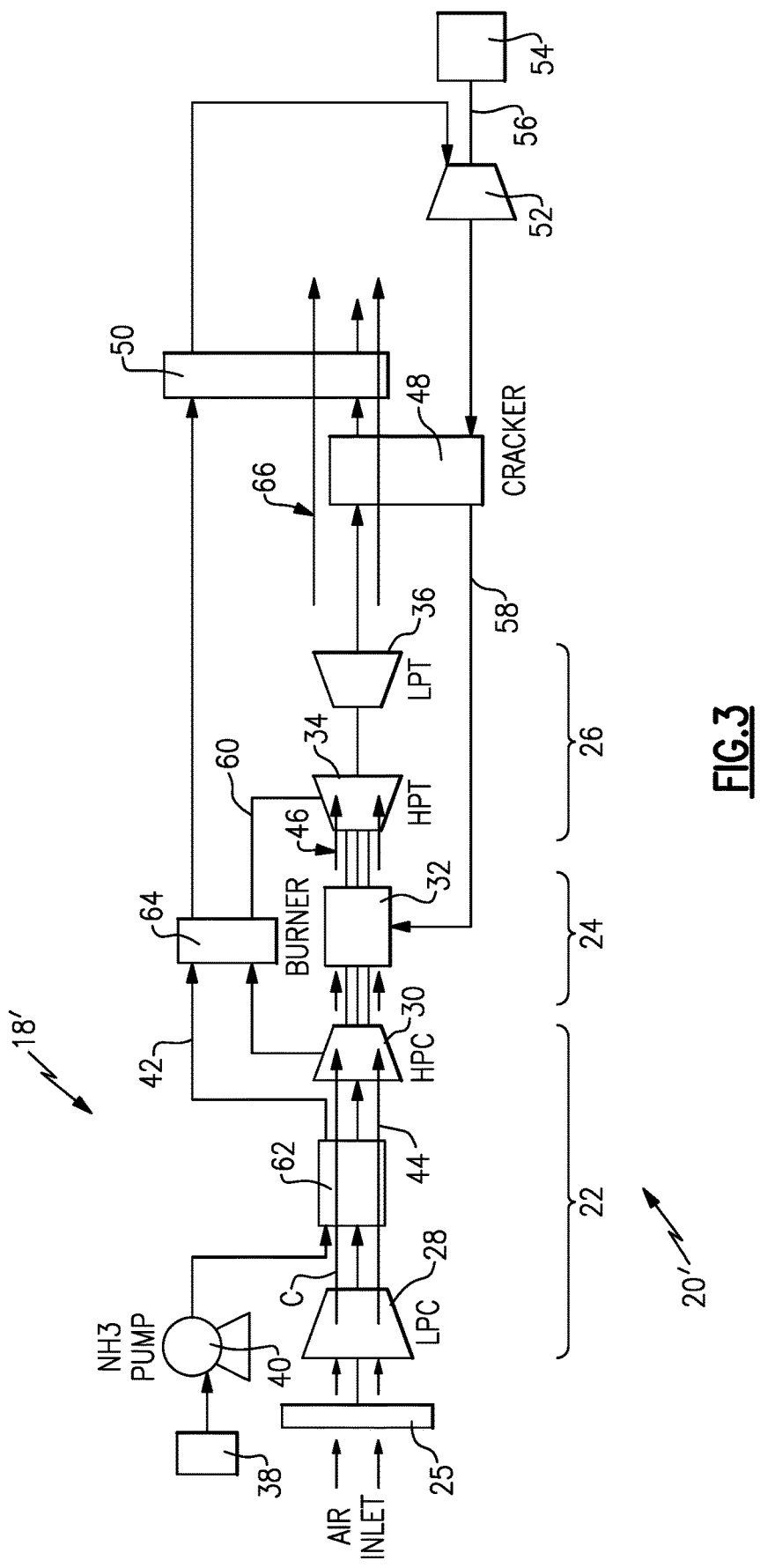
FIG. 3 is a schematic view of another example gas turbine engine embodiment.

Referring to FIG. 3, another engine assembly embodiment is schematically shown and indicated at 20'. The engine assembly 20' includes a fuel system 18' that includes a circuit for the ammonia flow 42 upstream of the cracking device 48 that takes advantage of the preferential thermal capacity of the ammonia flow 42. In this disclosed embodiment, the features of the engine 20' are the same as previously described with the addition of an intercooling heat exchanger 62 and a cooled cooling air heat exchanger 64.

Ammonia flow 42 is pressurized by the pump 40 and placed in thermal communication with a portion of the core airflow 44 at a location between the low pressure compressor 28 and the high pressure compressor 30 within an intercooling heat exchanger 62. Cooling the compressed core airflow 44 between the low pressure compressor 28 and the high pressure compressor 30 reduces the work requirement of the high pressure compressor 30 and reduces temperature of the core airflow 44 exiting the high pressure compressor 30 before the combustor 32. The thermal energy extracted from the core airflow 44 is recaptured by way of work performed by the turboexpander 52 and by injection and combustion of the decomposed ammonia flow in the combustor 32.

In this disclosed embodiment, ammonia flow 42 exhausted from the intercooling heat exchanger 62 is communicated to a cooled cooling air heat exchanger 64. Cooling airflow 60 is tapped from a location within the compressor section 22 and cooled by rejecting thermal energy into the ammonia flow 42 within the cooled cooling air heat exchanger 64. The cooled cooling air 60 is communicated to the turbine section 26 to cool structures exposed to the hot exhaust gas flow to enable hotter operating temperatures and thereby increased engine operating efficiencies. For example, the cooled cooling airflow 60 enables hotter exit temperatures from the combustor 32 without changes to the materials and structures comprising components of the turbine section 26.

It should be appreciated, that the example engine 20' directs ammonia flow 42 from the intercooling heat exchanger 62 to the cooled cooling air heat exchanger 64, however, separate ammonia flows may be directed through each heat exchanger and that alternate routing of the ammonia flow may be utilized within the contemplation and scope of this disclosure.

Moreover, although the disclosed engine embodiment 20' includes both the intercooling heat exchanger 62 and the cooled cooling air heat exchanger 64, it is within the contemplation and scope of this disclosure that either one of the heat exchangers 62, 64 may be included. For example, the engine 20' may only include the intercooling heat exchanger 62 without the cooled cooling air heat exchanger 64. Alternatively, the cooled cooling air heat exchanger 64 may be utilized without the intercooling heat exchanger 62.

Moreover, heat may be input into the ammonia flow from other structures, systems and sections of the engine 20'. These and other possible combinations of heat exchangers may be included within the contemplation and scope of this disclosure.

Figure 4:
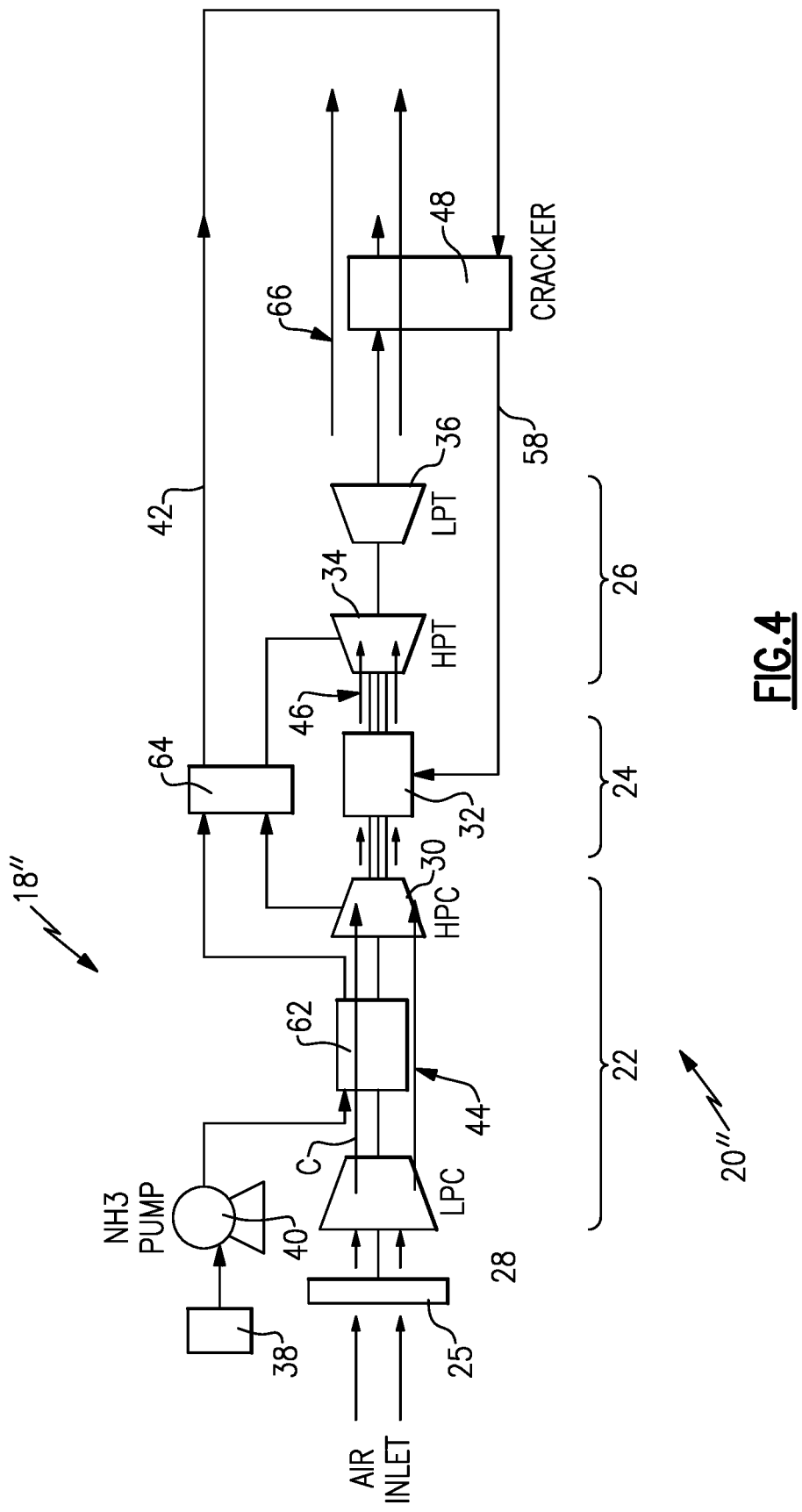
FIG. 4 is a schematic view of another turbine engine embodiment.

Referring to FIG. 4, another disclosed engine embodiment is schematically shown and indicated at 20" and includes a fuel system 18" for supplying an ammonia based fuel to the combustor 32. In this example embodiment, the intercooling heat exchanger 62 and the cooled cooling air heat exchanger 64 are utilized without the turboexpander illustrated in previous disclosed embodiments. The ammonia flow 42 accepts thermal energy from both heat exchangers 62, 64 and is communicated to the cracking device 48. The cracking device 48 thereby receives a heated ammonia flow 42 that is heated to a temperature based on the amount of thermal energy input by each of the heat exchangers 62, 64. The cracking device 48 is further provided thermal energy through communication with the hot exhaust gas flow 66. The thermal energy input into the ammonia flow 42 is thereby recovered by the efficiencies obtained by providing the fuel flow 58 to the combustor 30 at an increased temperature, and by any increase in fuel chemical energy (or LHV) as a result of any cracking in cracking device 48.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a core engine including a core flow path where air is compressed in a compressor section, communicated to a combustor section, mixed with an ammonia flow and ignited to generate a high energy combusted gas flow that is expanded through a turbine section, wherein the turbine section is mechanically coupled to drive the compressor section;
   an ammonia flow path communicating the ammonia flow to the combustor section;
   a cracking device disposed in the ammonia flow path, the cracking device configured to decompose the ammonia flow into component parts including hydrogen ($H_2$) and ammonia ($NH_3$); and
   at least one heat exchanger upstream of the cracking device that provides thermal communication between the ammonia flow and a working fluid flow such that the ammonia flow accepts thermal energy from the working fluid flow, wherein the at least one heat exchanger includes an intercooling heat exchanger and a cooling air heat exchanger, wherein the intercooling heat exchanger provides thermal communication between a core airflow within the compressor section and the ammonia flow and the cooling air heat exchanger provides thermal communication between a cooling airflow and the ammonia flow.

2. The gas turbine engine as recited in claim 1, further comprising a turboexpander downstream of the at least one heat exchanger, wherein the turboexpander is configured to generate a mechanical drive output from expansion of the ammonia flow communicated from the at least one heat exchanger.

3. The gas turbine engine as recited in claim 1, wherein the working fluid flow comprises a core airflow through the compressor section and the at least one heat exchanger provides intercooling of the core airflow within the compressor section.

4. The gas turbine engine as recited in claim 3, wherein the compressor section includes a low pressure compressor and a high pressure compressor and the at least one heat exchanger is configured to cool the core airflow after the low pressure compressor and before the high pressure compressor section.

5. The gas turbine engine as recited in claim 1, wherein the working fluid flow comprises a cooling airflow tapped from the compressor section and the at least one heat exchanger provides for the transfer of heat from the cooling airflow into the ammonia flow.

6. The gas turbine engine as recited in claim 1, wherein the working fluid flow comprises an exhaust gas flow aft of the combustor section and the at least one heat exchanger is configured to transfer thermal energy from the exhaust gas flow into the ammonia flow upstream of the cracking device.

7. The gas turbine engine as recited in claim 1, including an exhaust gas heat exchanger placing an exhaust gas flow in thermal communication with the ammonia flow exhausted from the cooling air heat exchanger.

8. The gas turbine engine as recited in claim 7, further comprising a turboexpander downstream of the cooling air heat exchanger, wherein the turboexpander is configured to generate a mechanical drive output from expansion of the ammonia flow.

9. The gas turbine engine as recited in claim 8, wherein the ammonia flow exhausted from the turboexpander is communicated to the cracking device.

10. The gas turbine engine as recited in claim 1, wherein the cracking device is in thermal communication with an exhaust gas flow to input thermal energy into the ammonia flow.

11. A fuel system for a turbine engine, the fuel system comprising:
    a fuel storage device configured to store an ammonia fuel;
    a cracking device configured to decompose the ammonia flow into component parts including hydrogen ($H_2$) and ammonia ($NH_3$);
    at least one heat exchanger upstream of the cracking device that provides thermal communication between the ammonia flow and a working fluid flow such that the ammonia flow accepts thermal energy from the working fluid flow, wherein the at least one heat exchanger includes an intercooling heat exchanger and a cooling air heat exchanger, wherein the intercooling heat exchanger provides thermal communication between a core airflow within a compressor section of the turbine engine and the ammonia flow and the cooling air heat exchanger provides thermal communication between a cooling airflow and the ammonia flow; and
    a turboexpander configured to receive the ammonia flow before the cracking device, wherein the ammonia flow is expanded through the turboexpander to drive a mechanical output.

12. The fuel system as recited in claim 11, including an exhaust gas heat exchanger placing an exhaust gas flow in thermal communication with the ammonia flow exhausted from the cooling air heat exchanger.

13. The fuel system as recited in claim 12, further comprising a turboexpander downstream of the cooling air heat exchanger, wherein the turboexpander is configured to generate a mechanical drive output from expansion of the ammonia flow.

14. The fuel system as recited in claim 13, wherein the ammonia flow exhausted from the turboexpander is communicated to the cracking device and the cracking device is in thermal communication with the exhaust gas flow to input thermal energy into the ammonia flow.

15. A method of operating a turbine engine, comprising:
transferring thermal energy from a working fluid flow into an ammonia flow within at least one intercooling heat exchanger prior to decomposition of the ammonia flow;
transferring thermal energy from the ammonia flow exhausted from the intercooling heat exchanger into a cooling airflow within a cooled cooling air heat exchanger;
decomposing the ammonia flow with a cracking device into a flow containing hydrogen ($H_2$) and ammonia ($NH_3$); and
communicating the flow containing hydrogen ($H_2$) and ammonia ($NH_3$) to a combustor configured to generate a gas flow.

16. The method as recited in claim 15, further comprising generating a mechanical drive output by expanding the ammonia flow through a turboexpander prior to decomposition of the ammonia flow.

17. The method as recited in claim 16, wherein the working fluid flow comprises a core airflow through a compressor section of the turbine engine and transferring of thermal energy comprises transferring thermal energy from the core airflow into the ammonia flow prior to decomposition of the ammonia flow.

18. The method as recited in claim 16, further comprising transferring thermal energy from a cooling airflow tapped from a compressor section into the ammonia flow within the cooled cooling air heat exchanger prior to decomposition of the ammonia flow.

* * * * *